United States Patent [19]
Eron

[11] 3,932,302
[45] Jan. 13, 1976

[54] FOAM GENERATOR

[76] Inventor: Robert E. Eron, 3375 34th St. North, St. Petersburg, Fla. 33714

[22] Filed: Jan. 21, 1974

[21] Appl. No.: 434,797

Related U.S. Application Data

[63] Continuation-in-part of Ser. No. 96,105, Dec. 8, 1970, Pat. No. 3,791,778, which is a continuation-in-part of Ser. No. 771,704, Oct. 30, 1968, abandoned.

[52] U.S. Cl. ................ 252/359 E; 418/169; 418/15
[51] Int. Cl.² ............................................ B01J 13/00
[58] Field of Search ............................ 418/167–169, 418/188, 15; 252/359 E

[56] References Cited

UNITED STATES PATENTS

| | | | |
|---|---|---|---|
| 2,619,292 | 11/1952 | Nichols, Jr. et al | 418/169 X |
| 3,234,962 | 2/1966 | Williamson | 418/236 X |
| 3,315,608 | 4/1967 | Eckerle | 418/169 X |
| 3,315,609 | 4/1967 | Eckerlė | 418/169 X |
| 3,459,275 | 8/1969 | Prillwitz et al. | 418/15 UX |
| 3,525,580 | 8/1970 | Eckerle | 418/169 X |
| 3,525,581 | 8/1970 | Eckerle | 418/169 X |

*Primary Examiner*—Jack Sofer
*Attorney, Agent, or Firm*—Stein & Orman

[57] ABSTRACT

A method and apparatus for simultaneously generating and pumping foam. As air is being pumped, foam solution is transmitted through a number of bores formed in at least one of the pump's pumping members, whereupon foam is generated when the solution emerges from the bores and is discharged at the pump's outlet.

2 Claims, 5 Drawing Figures

FIG. 3
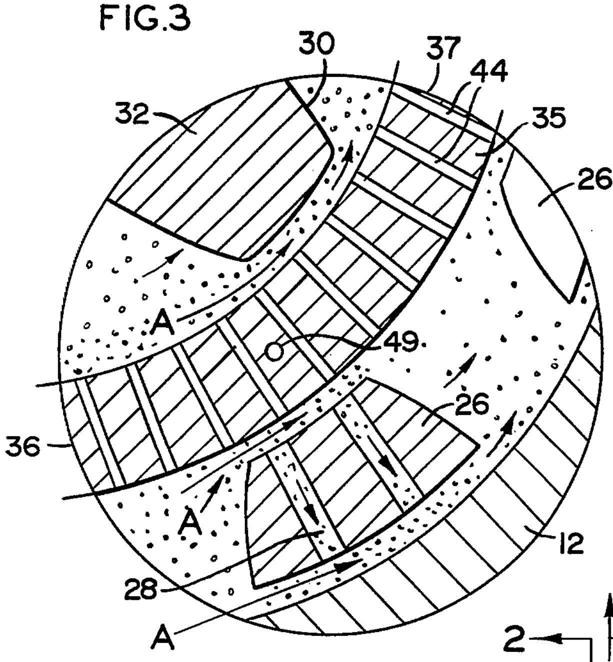
FIG. 4
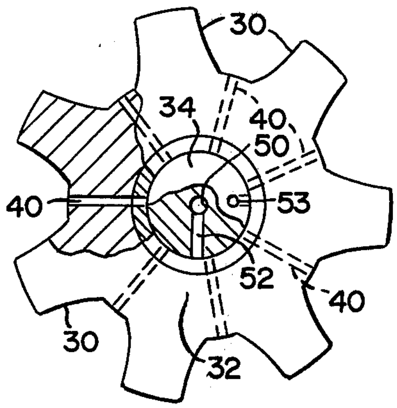
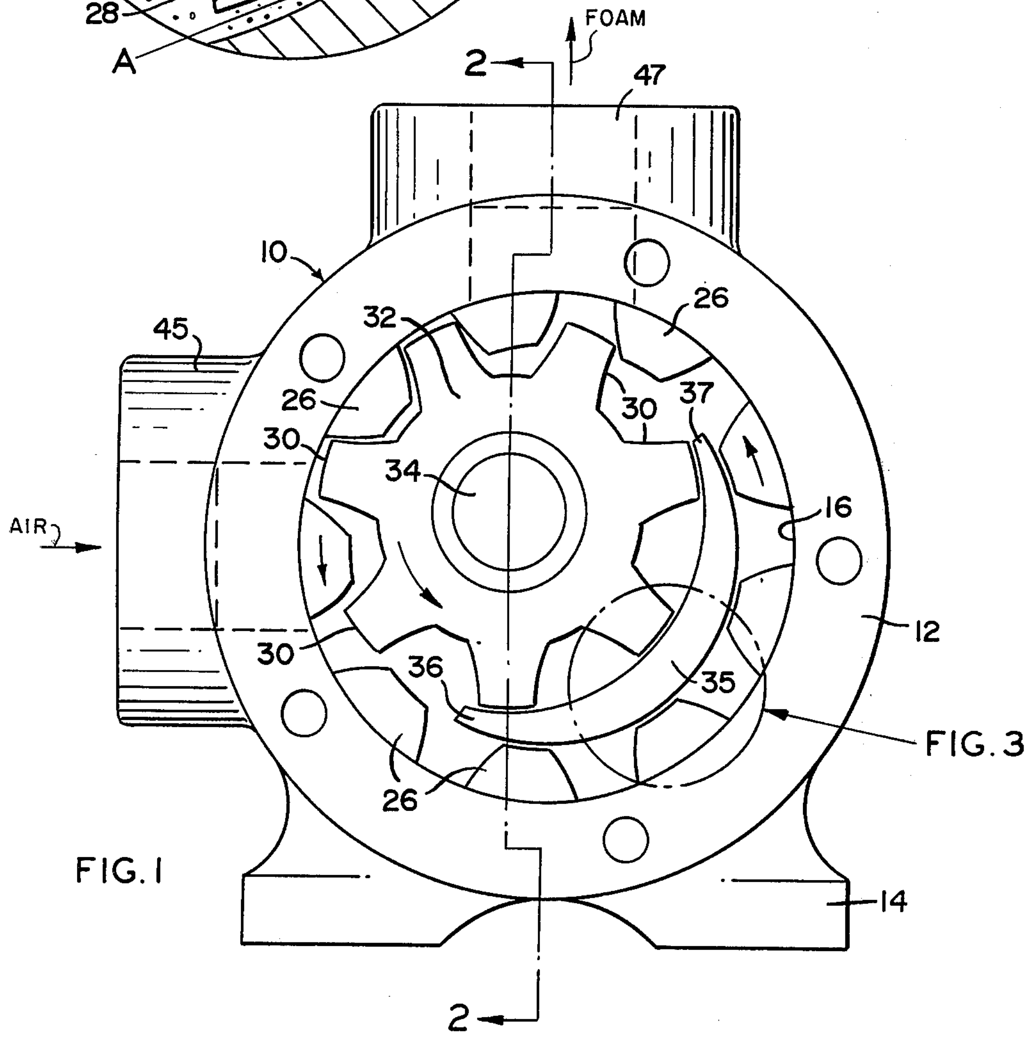
FIG. 1

FIG. 5
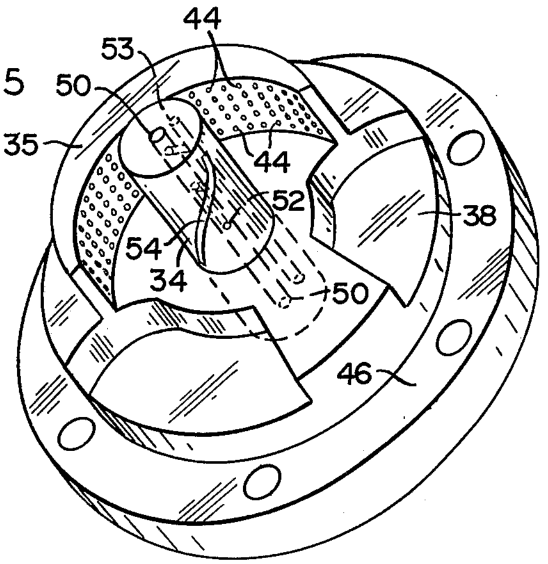
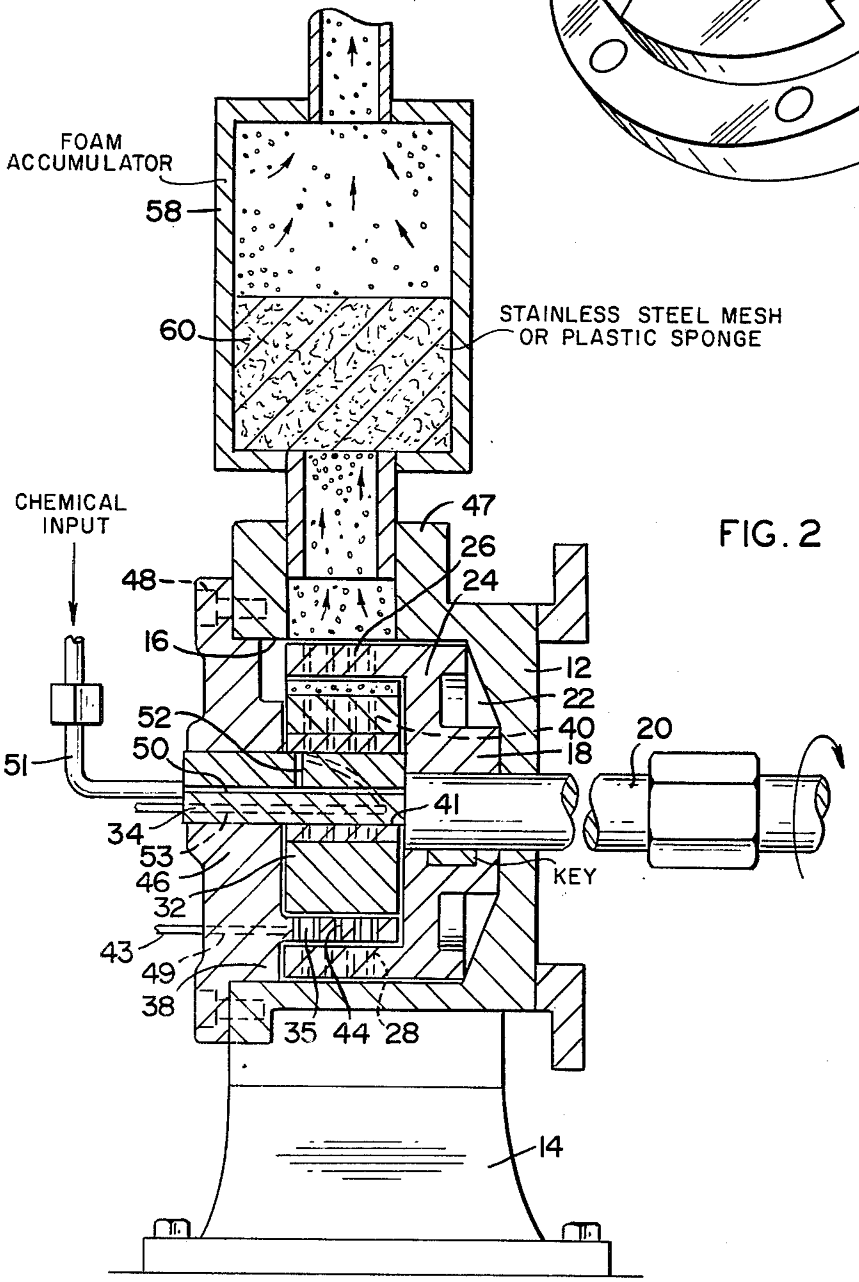
FIG. 2

FOAM GENERATOR

This is a continuation-in-part of my co-pending application Ser. No. 96,105 filed Dec. 8, 1970 which is now U.S. Pat. No. 3,791,778, issued Feb. 12, 1974, which was a continuation-in-part of my application Ser. No. 771,704, filed Oct. 30, 1968, now abandoned.

BACKGROUND OF THE INVENTION

1. Field of the Invention

This invention relates to a novel method and apparatus for generating and pumping foam. More particularly, this invention relates to a novel apparatus for generating and pumping foam by drawing fluid, generally air, into an intake of a pump introducing one or more chemicals and a foam solution into the fluid while it is being pumped, generating foam by passing the foam solution through a series of bores in at least one of the pumping members, and subsequently discharging this foam at the pump outlet.

2. Description of the Prior Art

Generated foam has many uses. The foam may be used not only for fighting fires wherein a blanket of foam is placed over the fire, but also in such uses as treating foliage with a foam-like insecticide, removal of wallpaper and in bleaching, to name only a few. However, present methods and apparatus for generating and distributing foam are unsatisfactory.

The most common method and apparatus for generating and pumping foam is the type where a foam solution is flowed over a netlike screen. As a blower forces air through the screen, the foam solution expands into air bubbles forming foam. The foam is then discharged through a suitable flexible conduit to a discharge site. This has many disadvantages. Not only is the blower and associated apparatus large and bulky, but the distance the foam may be transported before it is discharged is very limited. In addition, there is little or no control over the amount and texture of foam formed, and the foam will not flow into the wind without being scattered and rendered ineffectual. These disadvantages make this type of foam generator particularly detrimental in a number of applications where foam is utilized. For example, in fighting fires, the size of the blower and the apparatus normally requires at least two men to transport the apparatus to a site where the foam is to be released. Since the foam may not be transported to any great extent from the point where it is originally generated, the men fighting the fire must carry the apparatus relatively close to it. Further, since the foam scatters easily with the wind, it is usually necessary to place the apparatus in a location which is favorable to the direction in which the wind is blowing in order to have proper coverage of foam, which is not always possible. Another example of an application of foam where present foam generators are unsatisfactory is in applying a foam pesticide to foliage. Since the wind easily scatters the foam, the pesticide frequently damages plants which are not to be treated, and the lack of control over the quantity of foam generated frequently wastes the pesticide as more than necessary is utilized. Thus, as can easily be seen, it is desirable to have a method and apparatus for pumping foam which would overcome these disadvantages. It would also be desirable to have a foam generator wherein a number of different types of chemicals or ingredients can be selectively metered into the pump whereby a foam is generated which has a preselected chemical make-up in predetermined amounts.

OBJECTS OF THE INVENTION

Accordingly, it is an object of this invention to provide a novel method and apparatus for generating and pumping foam in which the foam is both generated and pumped simultaneously.

Another object of this invention is to provide a novel apparatus for generating and pumping foam wherein the apparatus is compact and easily portable.

Still another object of this invention is to provide a novel apparatus and method for generating and pumping foam in which the foam is produced and directed in a steady stream with such characteristics that it will flow into or across a wind stream without substantially scattering or disintegrating.

A further object of this invention is to provide a novel method and apparatus for generating and pumping foam wherein the foam is pumped with such a pressure that it may be transported a substantial distance.

A still further object of this invention is to provide a novel method and apparatus for generating and pumping foam wherein the foam generated and pumped may be substantially controlled.

Another object is to provide an apparatus for generating and pumping foam which is both practical and economically feasible to manufacture.

Another object is to provide a novel apparatus and method for generating foam in which a number of preselected chemicals or ingredients can be introduced and thoroughly mixed in the foam generator itself.

Another object is to provide a novel apparatus and method for generating a foam in which added chemicals are assured of being thoroughly mixed and dispersed within the foam.

Another object is to provide an apparatus for generating foam wherein metered amounts of predetermined substances can be automatically added to the foam generator with each rotation of the pump.

Other objects of the invention will in part be obvious and will in part appear hereinafter.

SUMMARY OF THE INVENTION

In accordance with the above objects the invention comprises a method of pumping foam with a rotary pump having an intake for receiving fluid, generally air, and an outlet for discharging foam. As the pump rotates, the fluid is drawn into the pump's intake where it is mixed with a predetermined amount of one or more chemicals and a foam solution. While the fluid, chemicals and foam solution are being pumped, they are forced through a number of bores formed in at least one of the pumping elements whereupon bubbles of foam are generated as the solution interacts with these bores. As the pump rotates, various "pumping forces" cause the foam solution to pass through the bores into the surrounding fluid whereupon foam bubbles are generated. These bores are suitably formed in at least one of the pumping elements with respect to the various pumping forces to gain maximum foam generation. Generation of foam also occurs to a limited extent by the natural turbulence of the fluid and foam solution resulting from the operation of the pump. Additionally, a plurality of chemical input means are provided in order that various chemicals can be placed within and thoroughly mixed within the pump chamber during the period of foam generation. These chemical inputs are provided with metering means whereby the amount and type of chemical may be preselected and the correct amount placed in the pump housing with each rotation. After being generated, the foam is pumped and subsequently discharged at the pump's outlet. In this manner, foam is continually generated, pumped and discharged by the pump.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 shows an end view of the pump with parts exposed to show the relationship of the pumping member.

FIG. 2 is a cross-sectional elevation view of the pump along the lines 2—2 of FIG. 1.

FIG. 3 is a cross-sectional enlarged view of the designated circular area in FIG. 1.

FIG. 4 is a cross-sectional view of the idler.

FIG. 5 is a perspective view of the end cover of the pump showing the manner of distributing the foam solution.

Similar reference characters refer to similar parts throughout the several views of the drawings.

DETAILED DESCRIPTION OF THE PREFERRED EMBODIMENTS

Referring now to the drawings in detail which show a preferred embodiment of the present invention and not for the purpose of limiting same. As best seen in FIGS. 1 and 2, the improved pump generally indicated as 10 comprises a housing 12 made of suitably shaped casting of metal or plastic which is supported on a pedestal 14. The housing has an inner cylindrical surface 16 defining a pumping chamber which has rotor 18 rotatably mounted therein. Rotor 18 is keyed to drive shaft 20 extending through a suitable opening formed in an integral end 22 of housing 12.

The general form of rotor 18 is best shown in FIGS. 1 and 2 and includes a disk-shaped support plate 24 for supporting a plurality of circumferential teeth 26 of the general shape shown. Each of these teeth may have a series of radial bores 28 (see FIGS. 2 and 3) extending therethrough for receiving a predetermined mixture of fluid, chemicals and foam solution. The rotor 18 rotates concentrically with the cylinder wall 16 and is slightly spaced from the wall for a suitable rotating clearance without substantial drag on the wall.

Meshing with teeth 26 of the rotor are teeth 30 of an idler 32 positioned and rotatably mounted as shown on idler support pin 34. The shapes of the teeth 26 and 30 respectively are so arranged as to mesh properly with one another and provide a pumping action, hereinafter described, in combination with a crescent-shaped partition 35 having a forward end 36 and rearward end 37. Both the partition 35 and support pin 34 are mounted on a diskshaped support plate 38. Gear pockets comprise the spaces between the teeth of the gears.

Referring now to FIG. 4, idler 32 is shown having a plurality of small radial bores 40 extending from the interior wall 41 of idler 32 and communicating with the interior of pump housing 12. Bores 40 may be utilized to transmit chemicals, fluid, and foam solution from a remote location to the interior of pump housing 12. The chemicals and foam solution are delivered to pump housing 12 by a pipe, such as conduit 51 from a suitable source (not shown). Conduit 51 is connected to a longitudinal bore 50 drilled in idler pin 34. Longitudinal bore 50 communicates through a plurality of radial passages 52 to a slot 54 (see FIG. 5) located on the surface of idler pin 34. The arrangement is such that as idler 32 rotates, slot 54 will sequentially cover and uncover depending upon the arrangement of radial bores 40 in idler 32. When a portion of slot 54 is uncovered, the internal pressure in line 51 together with uncovered slot 54 will cause a metered amount of liquid to flow into pump housing 12. It is also contemplated that a second longitudinal bore 53, with radial passages 52 or even additional longitudinal bores (not shown) be utilized to place different chemicals in different metered amounts into pump housing 12.

Pin 34 and mounted idler 32 have an axis that is parallel to, but eccentric with respect to, the axis of rotor 18. This eccentricity creates a crescent space between the idler and rotor which is substantially filled by the crescent-shaped partition 35. Rotational clearance is provided between the teeth of the rotor and idler and crescent 35. Crescent partition 35 has bores 44 in order that further sloshing and mixing with resultant foaming of the constituent elements, as described above, will take place. In addition to crescent partition bores 44, a plurality of inlet bores 49 are provided which are arranged transverse to radial bores 44 such that they communicate with the outside of pump housing 12. These transverse bores 49 and their associated conduits 43 are attached to chemical or fluid supply sources together with suitable, standard control and metering means such that by preselection, a predetermined amount of chemical or fluid can be placed in pump housing 12 through conduits 43 and transverse bore 49.

Referring now to FIG. 1, an inlet port 45 for receipt of fluid and an outlet port 47 for discharge of foam are formed in housing 12 are shown. As mentioned, idler pin 34 and crescent partition 35 are carried on support plate 38. This support plate is formed with two diameters. The smaller diameter is slightly less than the diameter of inner cylinder 16 of pump housing 12 and fits snugly into the cylinder 16 as shown in FIG. 2. The outer diameter of the disk-plate forms a cover plate 46 which is removably secured by bolts 48 to housing 12.

Removably attached to the discharge outlet 47 of the pump is a cylindrical foam accumulator 58 having a reduced neck portion for insertion into the outlet. Riding within the accumulator is a stainless steel mesh or plastic sponge plug 60. The wire mesh plug acts as a resistance to the discharge of the foam and performs two operations: it smooths the pulsations of foam being emitted from the pump, thus maintaining a flow of foam at a uniform rate; and compacts the foam to a desired density which also assists in preventing the foam from billowing out of or leaving the pump too soon. The size of the wire mesh or resistance is determined by the density of the foam desired but is always of such size as to pass the foam without undue impedence. In practice, it has been found that without the resistance in the discharge, an appreciable amount of foam solution is discharged as well as foam. With the resistance in place, only foam is discharged.

In operation, drive shaft 20 rotates rotor 18 when a prime mover is started. Since teeth 26 of rotor 18 are meshed with teeth 30 of idler 32, rotation of the rotor simultaneously rotates idler 32. As they rotate, a fluid such as air or the like is admitted at intake 45, and foam solution is passed under a desired pressure through one of the inlet ports such as longitudinal bore 50, passageway 52, distribution slot 54 and finally through idler bores 40.

In addition metered amounts of chemicals in liquid form or in solution are selectively fed, in predetermined amounts, into pump housing 12 either through other longitudinal slots in idler pin 34 or by other inlet bores 49 located in crescent 35 or in the walls of pump housing 12. Thus, the input chemicals will be thoroughly mixed and disseminated in the foam generated in pump housing 12. As the foamed solution emerges from the bores 40, part of the solution bubbles into foam but a substantial portion still remains as a solution. Thus, as the rotor 18 rotates, additional fluid is drawn into the intake 45 and there combined with additional foam solution and chemicals which are being added.

Bores 28, if provided, in rotor teeth 26 will assist in foam generation. As the rotor rotates, a centrifugal force is created in any foam solution caught in the bores. This, coupled with a Bernoulli suction effect, draws the solution outward, and as it emerges from the rotor bores bubbles into foam. These bubbles of foam also act to seal the rotating clearance between the rotor and cylinder wall 16.

During a portion of the pumping cycle in which the idler and rotor carry the foam, fluid, remaining foam solution and chemicals along the crescent partition, both the idler and outer rotor form cavities or pockets between their teeth and the partition, as easily seen in FIG. 1, which carries foam, fluid, foam solution and chemicals forwardly. At this portion of the cycle, as best seen in the enlarged view in FIG. 3, the significant means of generating foam is provided by bores 44 in the crescent partition. Due to inherent characteristics, the pressure of the fluid, foam, foam solution and chemicals in the pockets of the idler will be different than a similar pressure between the pockets of the rotor. Consequently, the foam solution will flow through the crescent bores 44 to the side having the least pressure. As the solution emerges from the bores, it bubbles and foam is generated. In addition, as the idler and rotor sweep past the crescent bores, a suction effect is created which pulls out foam solution in the crescent body bores which generates even more foam (see arrows designated A, FIG. 3). This foam also acts to seal the rotating clearance between the crescent and the idler and rotor.

As the idler and rotor teeth pass the rearward end 37 of crescent-shaped partition 36, the foam solution has been substantially changed to foam and when the teeth begin to mesh together and reduce the volume available for the foam, it is forced under pressure through the outlet. The wire mesh 60 in the accumulator 58 acts as a resistance and compacts and smooths the flow of the foam being discharged. In this application, as well as others, the size of the pump makes it easy to handle; the nozzle from which the foam is emitted may be a substantial distance from the pump itself, which makes frequent moves of the pump unnecessary; the foam may be deposited on the foliage desired without undue danger of its being scattered by the wind to other plants; and, finally, the quantity of foam being deposited on a particular plant may be easily controlled.

As seen by the above description, a novel method and apparatus for simultaneously generating and pumping foam has been produced. Foam is generated by first drawing fluid into the pump mixing a foam solution and certain preselected chemicals with the fluid and then passing the solution through appropriately sized bores in at least one of the pumping members. The generated foam is then pumped to the outlet of the pump and discharged. Since the diameter of the bores determines the size of foam bubbles generated, the bores may be suitably drilled with a diameter corresponding to the size of bubbles desired for a particular foam application. The amount of foam generated can also be easily controlled by regulating the speed of the pump or amount of foam solution. Since the pump is of the positive displacement type, the foam may be discharged a relatively long distance via a suitable conduit to a discharge site. The positive pressure, along with the compacting and smoothing means of the wire mesh screen, also provides a stream of foam which will go into a wind stream without substantially scattering or disintegrating.

The pump may be made in small units and cast of plastic which makes it light and portable as well as economical and practical to manufacture.

The pump also lends itself easily to a number of applications where foam may be utilized. In addition to fighting fire, removing wallpaper and as a bleaching agent, the pump is particularly adaptable to be used to apply a pesticide to a plant by mixing the pesticide with the foam solution.

It is to be understood that although this type of pump is preferred for producing the best results, other variations of pumps also can be used for producing the foam under this method.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A foam generator and pump constructed to produce a foamed discharge, said foam generator and pump comprising: a housing having at least one inlet for introducing fluid and for introducing a foaming solution into said housing; at least one outlet means for discharging foam; agitating means movably mounted within said housing; said agitating means comprising a pair of eccentric but co-planar rotors including one inner rotor and one outer rotor; each of said rotors having teeth formed thereon and said outer rotor arranged in cooperative substantially surrounding relation to said inner rotor, said inner and outer rotors being externally and internally geared respectively in intermeshing engagement during only a portion of their relative movement; a partition positioned between said rotors in the area where said rotors are not in intermeshing engagement; said partition including a plurality of bores formed therethrough for transmitting a foam solution between the gear pockets and the teeth of said rotors; said bores comprising at least one radial partition bore and at least one axial inlet partition bore; said radial bores being formed in cooperative relation between the gear pockets and between the teeth of said inner and outer rotors, whereby foam is generated by the interaction of fluid and foaming solution with said gear pockets, said teeth and said bores, said axial partition bore providing means for extraneous chemical input.

2. A foam generator and pump as in claim 1 wherein said outer rotor is fixedly connected to a drive shaft and said inner rotor is an idler gear driven by said outer rotor.

* * * * *